Ross Hickman, Inventor

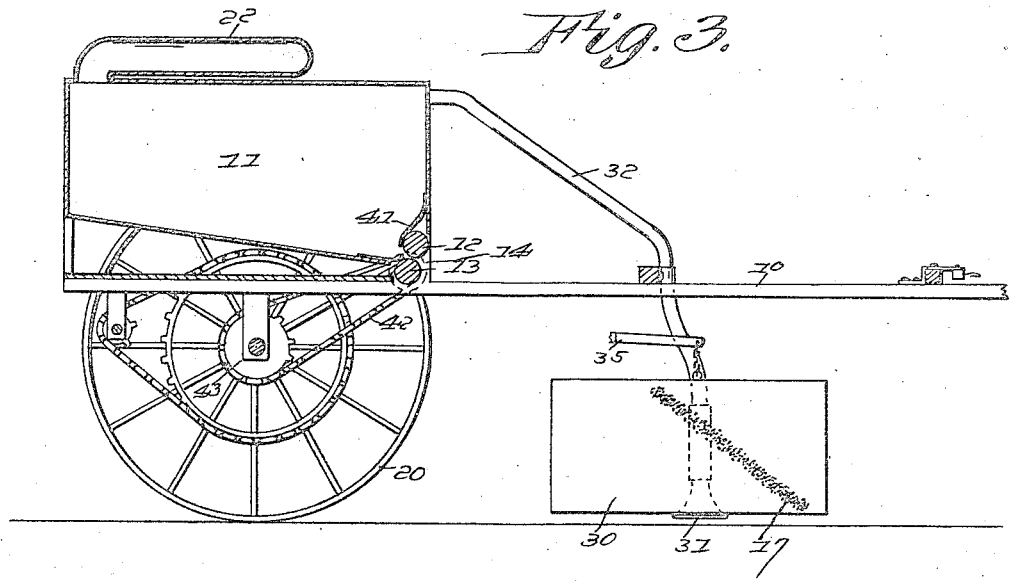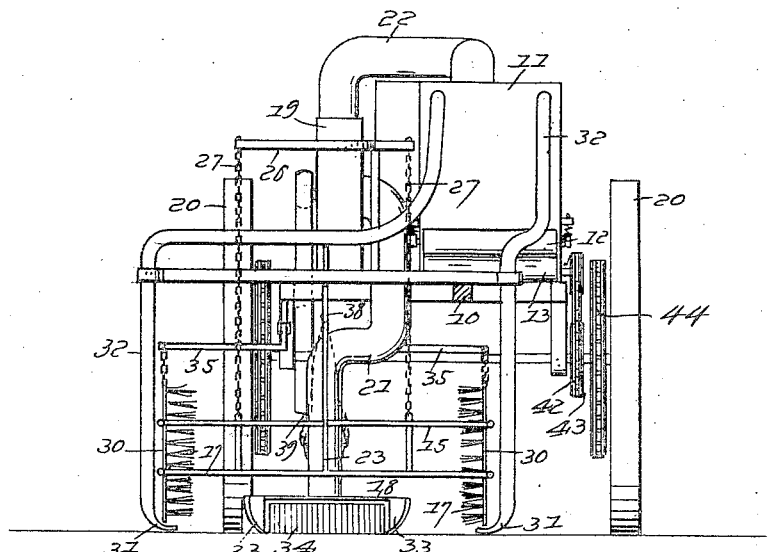

Patented Apr. 1, 1924.

1,489,214

UNITED STATES PATENT OFFICE.

ROSS HICKMAN, OF OKLAUNION, TEXAS.

BOLL-WEEVIL CATCHER.

Application filed January 18, 1923. Serial No. 613,411.

*To all whom it may concern:*

Be it known that Ross HICKMAN, a citizen of the United States of America, residing at Oklaunion, in the county of Wiltbarger and State of Texas, has invented new and useful Improvements in Boll-Weevil Catchers, of which the following is a specification.

The object of the invention is to provide a machine for effectively detaching or dislodging boll weevils and like destructive insects around growing plants particularly in rows, and such as cotton plants and gathering and destroying such insects, and more particularly to provide a machine for that general purpose whereby the dislodging and gathering of the insects may be effected continuously as the machine is propelled on a path parallel with the rows of plants, and furthermore in this connection to provide a machine which will accomplish the desired object and which will operate with the minimum risk of injury to the plants and the product; and with these objects in view the invention consists in a construction and combination of parts of which a preferred embodiment is shown in the accompanying drawings, wherein:—

Figure 3 is a longitudinal sectional view of the same on the plane indicated by the line 3—3 of Figure 2.

Figure 4 is a front view thereof.

Figure 1:
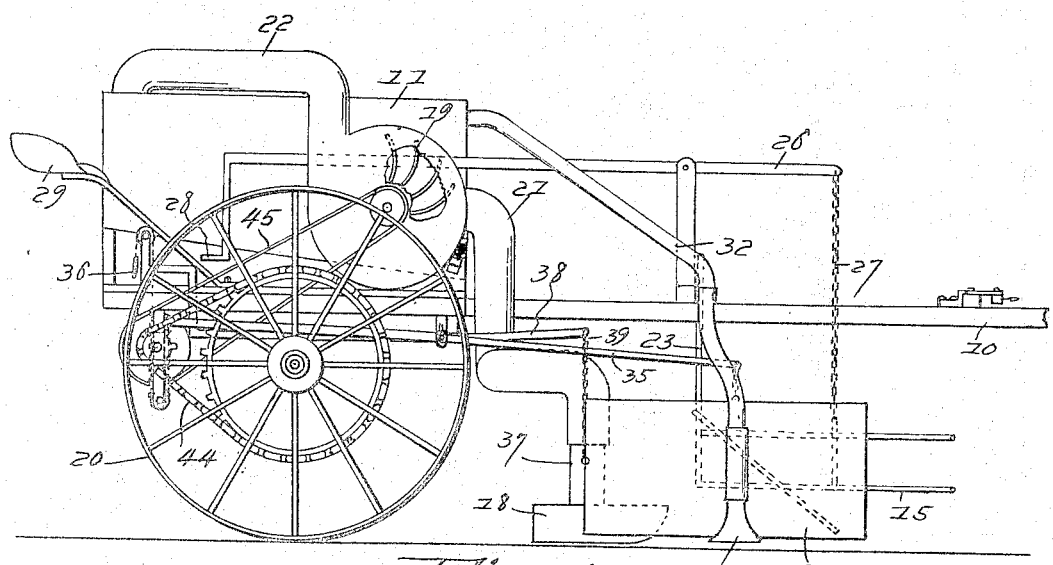
Figure 1 is a side view.
Figure 2:
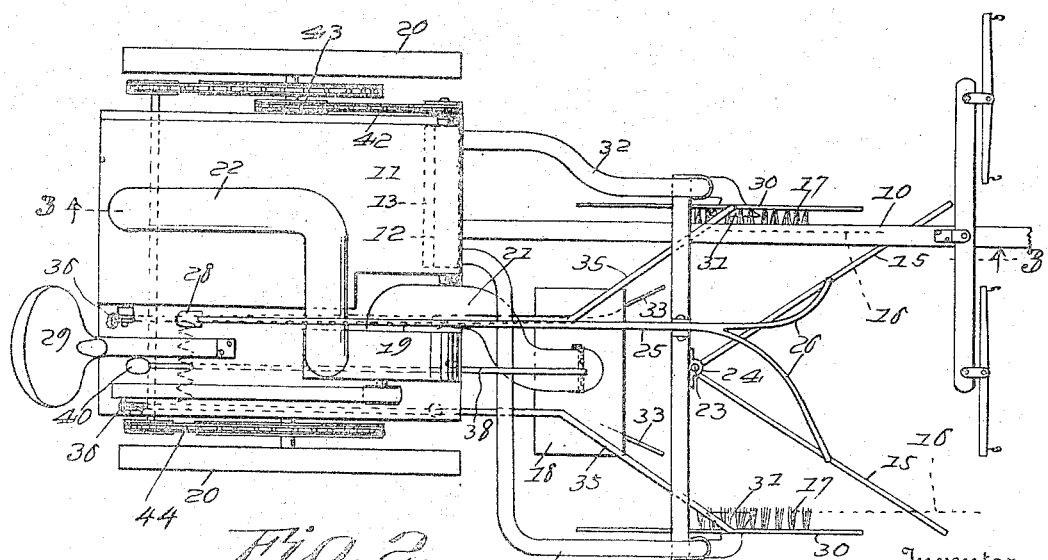
Figure 2 is a plan view of a machine embodying the invention.

The machine embodies essentially a wheel supported frame having a draft tongue 10 and carrying a tank 11 within which are arranged crushing rollers 12 and 13 adjacent to an outlet 14 and designed to destroy the insects gathered and deposited in the receptacle, together with a gathering yoke having forwardly divergent arms 15 for drawing the limbs or branches of the plants in adjacent rows toward each other over a space between the rows indicated in Figure 2 at 16, brushes 17 for detaching the insects from the branches of the plants, a suction box 18 operating close to the ground and adapted to gather the insects through the effect of a suction fan 19 carried by the machine and actuable, for example, from the ground wheels 20 thereof, said suction fan being connected with the suction box or shoe 18 by means of a pipe 21 and being connected with the receptacle 11 by means of the outlet pipe 22.

The forwardly divergent arms 15 of the yoke are adapted to engage the branches of the cotton plants and draw them inward over the space between the two rows being operated upon and this yoke is vertically movable by means of an upright rod 23 operating in a suitable guide 24 and is actuable by a lever 25 which is forked at its front end as shown at 26 with its extremities connected by chains 27 with the arms of the yoke, so that the operator by pressure upon the treadle 28 at the rear end of said lever may vary the elevation of the yoke to the height of the plants, said treadle being readily accessible from the driver's seat 29.

At the sides of the path traversed by the yoke and somewhat to the rear of the forward ends of the arms thereof are the brushes 17 carried by fender plates 30 which are designed to detach insects which may have escaped the yoke and come into contact with the brush bristles, and located beneath each fender plate is a blow nozzle 31 fed by a pressure pipe 32 extending from the receptacle 11, which is under air pressure fed by the fan 19, so that insects dropping to the ground are blown inward toward the path of the shoe 18 which is provided with forwardly projecting gathering wings 33 and a brush 34, and is interiorly exposed to the suction of the fan 19 so as to raise and carry insects to the fan casing for projection through the pipe 22 into the receptacle 11. The fender plates with the attached brushes are vertically adjustable by means of levers 35 of which the treadles 36 at their rear ends are also accessible to the driver.

The suction pipe 21 which extends from the suction box or shoe 18 to the fan casing is of telescoping construction as indicated at 37 to permit of varying the elevation of the shoe through the agency of a lever 38 connected with the lower telescopic section by a chain 39 and having at its rear end a treadle 40 for operation by the driver.

Adjacent to the crushing rolls 12 and 13 are arranged packing strips 41 so that the blast of air discharged into the receptacle 11 by the fan and carrying with it the insects gathered by the shoe 18, while being available to feed the blast pipes 32 is prevented from escaping around the rollers, and direct rotary motion is communicated to one of the rollers by means of a chain 42 actuated by a sprocket wheel 43 on one of the ground wheels. The fan is also driven from the ground wheels through suitable chain and sprocket gearing 44 and belt and pulley connections 45, so disposed as to cause a sufficiently rapid rotation of the fan to induce a suction strong enough to lift insects and the like from the surface of the ground and carry them into the receptacle 11 from whence they find an escape only between the rollers.

Having described the invention, what is claimed as new and useful is:—

1. A boll weevil catching machine having, in combination with a suction device and means for operating the same, a receptacle in communication with the discharge of the suction device, means for detaching insects from the plants including a yoke, a suction shoe operating close to the surface of the ground on a path between rows of plants and operatively connected with the suction device, and inwardly directed blast nozzles arranged in advance of and at opposite sides of the path of said suction shoe and in communication with said receptacle, and means for varying the elevation of said yoke.

2. A boll weevil catching machine having, in combination with a suction device and means for operating the same, a receptacle in communication with the discharge of the suction device, means for detaching insects from the plants, a suction shoe operating close to the surface of the ground on a path between rows of plants and operatively connected with the suction device, and inwardly directed blast nozzles arranged in advance of and at opposite sides of the path of said suction shoe and in communication with said receptacle, said insect detaching means having a yoke provided with forwardly divergent gathering arms arranged in advance of the suction shoe, and brush carrying fender plates located at opposite sides of the path of the suction shoe in rear of the forward end of the yoke.

3. A boll weevil catching machine having, in combination with a suction device and means for operating the same, a receptacle in communication with the discharge of the suction device, means for detaching insects from the plants, a suction shoe operating close to the surface of the ground on a path between rows of plants and operatively connected with the suction device, and inwardly directed blast nozzles arranged in advance of and at opposite sides of the path of said suction shoe and in communication with said receptacle, said insect detaching means having a yoke provided with forwardly divergent gathering arms arranged in advance of the suction shoe, and brush carrying fender plates located at opposite sides of the path of the suction shoe in rear of the forward end of the yoke, the blast nozzles being disposed adjacent to the lower edges of said fender plates.

In testimony whereof he affixes his signature.

ROSS HICKMAN.